United States Patent [19]

Oleck et al.

[11] Patent Number: 4,568,655

[45] Date of Patent: Feb. 4, 1986

[54] CATALYST COMPOSITION COMPRISING ZEOLITE BETA

[75] Inventors: Stephen M. Oleck, Moorestown; Robert C. Wilson, Jr., Woodbury, both of N.J.

[73] Assignee: Mobil Oil Corporation, New York, N.Y.

[21] Appl. No.: 665,604

[22] Filed: Oct. 29, 1984

[51] Int. Cl.$^4$ .................... B01J 29/14; B01J 29/34; B01J 29/36

[52] U.S. Cl. ............................ 502/66; 502/67; 502/68; 208/216 R; 208/216 PP; 208/251 H; 208/111

[58] Field of Search ............... 502/66, 67, 68, 69; 208/216 PP, 216 R, 251 H, 254 H, 111

[56] References Cited

U.S. PATENT DOCUMENTS

| | | | |
|---|---|---|---|
| 3,546,103 | 12/1970 | Hamner et al. | 208/211 |
| 3,755,145 | 8/1973 | Orkin | 208/111 |
| 3,894,938 | 7/1975 | Gorring et al. | 208/97 |
| 4,225,421 | 9/1980 | Hensley, Jr. et al. | 208/216 PP |
| 4,411,770 | 10/1983 | Chen et al. | 208/111 |
| 4,428,819 | 1/1984 | Shu et al. | 208/46 |
| 4,456,700 | 6/1984 | Oleck et al. | 502/220 |
| 4,458,024 | 7/1984 | Oleck et al. | 502/66 |

*Primary Examiner*—John Doll
*Assistant Examiner*—O. Chaudhuri
*Attorney, Agent, or Firm*—Alexander J. McKillop; Michael G. Gilman; Dennis P. Santini

[57] ABSTRACT

A single catalyst system capable of demetalizing, hydrotreating and hydrodewaxing petroleum residue in a single stage process is described. The catalyst system utilized includes one or more metal oxides or sulfides of Group VIA and Group VIII of the periodic Table impregnated on a base of refractory oxide material and Zeolite Beta. The catalyst also has about 75% of its pore volume in pores no greater than 100 Angstrom units in diameter and about 20% of its pore volume in pore greater than about 300 Angstrom units in diameter.

8 Claims, No Drawings

CATALYST COMPOSITION COMPRISING ZEOLITE BETA

BACKGROUND OF THE INVENTION

1. Field of the Invention

This application is directed to a catalytic process for hydrotreating heavy hydrocarbon streams containing waxy components, sulfur, metals and asphaltic materials. It more particularly relates to hydroprocessing these heavy hydrocarbon streams using catalytic treatment with a catalyst which effectively provides for demetallation, desulfurization and dewaxing of the hydrocarbon.

2. Description of the Prior Art

It is well known that many, if not most, petroleum base feedstocks contain contaminants, such as, for example, sulfur, nitrogen and metals. It is desirable, particularly if these feedstocks are to be further processed, that the contaminants be removed. This is an operation usually requiring the use of a catalyst. These feedstocks also usually contain waxy components which, because of the resultant high pour point, are difficult to pump and process. Thus, it is also desirable to reduce the amount of waxy component and to accordingly reduce the pour point of the feedstock.

It is known in the art to effect sulfur removal from hydrocarbon stocks by subjecting time to treatment with hydrogen at elevated temperature and pressure while in contact with a catalyst containing hydrogenating components. Typically, the hydrogenating components of such prior art catalysts are Group VIA or Group VIII metals, or their oxides or sulfides. These hydrogenating components may be supported on a variety of wellknown carriers, for example, alumina, kieselguhr, zeolitic molecular sieves and other materials having high surface areas; see in this regard U.S. Pat. No. 4,080,296. U.S. Pat. No. 3,546,103 teaches hydrodesulfurization with a catalyst which includes cobalt and molybdenum on an alumina base. U.S. Pat. No. 3,755,145 describes a process for preparing lube oils, characterized by low pour points, which utilizes a catalyst mixture comprising hydrogenation components, a conventional cracking catalyst which can be either crystalline or amorphous and a crystalline aluminosilicate zeolite having a Constraint Index of 1 to 12.

U.S. Pat. No. 3,894,938 relates to the catalytic dewaxing and desulfurization of high pour point, high sulfur gas oils to lower their sulfur content by contacting such an oil first with a zeolite hydrodewaxing catalyst having a Constraint Index of 1 to 12, which may contain a hydrogenation/dehydrogenation component, in the presence or absence of added hydrogen followed by conventional hydrodesulfurization processing of the dewaxed intermediate.

U.S. Pat. Nos. 4,456,700 and 4,458,024 relate to a process for hydrodewaxing and hydrotreating petroleum residua to more valuable products. The catalyst system described in U.S. Pat. No. 4,458,024 includes a zeolite having a Constraint Index of 1 to 12, an alumina binder, at least one Group VIII metal selected from nickel, cobalt and iron, and at least one Group VIB metal. The catalyst is characterized by specific metals content and pore volume features. A related development is described in copending Application Ser. No. 307,555, filed Oct. 1, 1981.

U.S. Pat. No. 4,225,421 describes a process for hydrodemetallation and hydrodesulfurization of a hydrocarbon feedstock containing asphaltenes and metals by contacting the feedstock with hydrogen and a bimodal catalyst which contains at least one metal, e.g., molybdenum, chromium and tungsten.

U.S. Pat. No. 4,411,770 describes a process for the hydroconversion of heavy hydrocarbon oils, wherein the catalyst comprises a crystalline zeolite component and a metallic hydrogenation component. The zeolites taught as being useful in this process include zeolites having a Constraint Index of 1 to 12 and Na-Beta.

Copending Application Ser. No. 379,421, filed May 18, 1982, discloses a process and catalyst for simultaneously hydrocracking and dewaxing heavy hydrocarbon oils, such as vacuum gas oil. The catalyst system utilized is described as including 10–99% by weight, preferably 25–80% by weight Zeolite Beta, a porous matrix material, such as alumina, and a hydrogenation component derived from one or more metals of Groups VA, VIA or VIIIA of the Periodic Table (the Periodic Table referred to herein is the Table approved by IUPAC and the U.S. National Bureau of Standards, and is shown, for example, in the Table of the Fisher Scientific Company, Catalog No. 5-702-10, and is the Table of reference for this application).

Copending Application Ser. No. 310,550, filed Oct. 13, 1981, now abandoned, describes a single stage operation for hydrotreating and hydrodewaxing of petroleum residua using a dual catalyst system, i.e., a hydrodesulfurization catalyst combined with a metal-containing ZSM-5 hydrodewaxing catalyst.

Copending application Ser. No. 665,605, filed Oct. 29, 1984, describes a process for simultaneously hydrotreating and dewaxing distillable petroleum fractions using a catalyst comprising Zeolite Beta, an inorganic oxide material and a hydrogenation/dehydrogenation component.

SUMMARY OF THE INVENTION

This invention is directed to a single catalyst system capable of simultaneously demetalizing, hydrotreating and hydrodewaxing petroleum residua in a single stage process. The catalyst system of the present invention includes one or more Group VIA or Group VIII metals, or their oxides or sulfides, or mixtures thereof, impregnated on a base comprising Zeolite Beta admixed with one or more inorganic oxides.

The invention is further directed to a catalytic composition comprising a base component, including 5–30 wt % Zeolite Beta and 95–70 wt % of an inorganic oxide material, based on the combined weight of the zeolite catalyst and the inorganic oxide material, and a hydrogenation/dehydrogenation component supported on the base component, said hydrogenation/dehydrogenation component including a catalytically effective amount of at least one metal selected from Group VIA and Group VIII of the Periodic Table, said catalyst having about 75% of its pore volume in pores no greater than 100 Angstrom units in diameter and about 20% of its pore volume in pores greater than about 300 Angstrom units in diameter.

In another embodiment, the invention is directed to a process for demetalizing, hydrotreating and dewaxing petroleum residua, which process comprises contacting the residua, at least 50% of which boils above 900° F., with a catalyst comprising a base component including 5–30 wt % Zeolite Beta and 95–70 wt % of an inorganic oxide material, based on the combined weight of the zeolite catalyst and the inorganic oxide material, and a hydrogenation/dehydrogenation component supported on the base component. The hydrogenation/dehydrogenation component includes a catalytically effective amount of at least one metal selected from Group VIA and Group VIII of the Periodic Table. The catalyst has about 75% of its pore volume in pores no greater than 100 Angstrom units in diameter and about 20% of its pore volume in pores greater than about 300 Angstrom units in diameter.

Further, the invention is directed to a process for hydrotreating, demetalizing and dewaxing petroleum residua, which process comprises contacting the residua, at least 50% of which boils above 900° F., with a catalyst comprising 5-30 wt % Zeolite Beta and 95-70 wt % alumina, based on the combined weight of Zeolite Beta and alumina, and 10-25 wt %, based on total catalyst weight, of nickel oxide in an amount of 2-10 wt % and molybdenum oxide in an amount of 5-20 wt %. The catalyst was 75% of its pore volume in pores no greater than 100 Angstrom units in diameter and about 20% of its pore volume in pores greater than about 300 Angstrom units in diameter. The contacting is carried out in the presence of hydrogen gas at a total pressure of about 500-3000 psig, a temperature of about 600°-850° F. (315°-455° C.) and a liquid hourly space velocity of 0.1-5 based on the total complement of catalyst in the system.

DESCRIPTION OF SPECIFIC EMBODIMENTS

The present invention is generally directed to hydrotreating heavy hydrocarbon feedstocks which contain asphaltenes, metals, nitrogen compounds, sulfur compounds and waxy components. More specifically, the process is directed to treating feedstocks that contain small amounts of metal, e.g., from about 30 ppm to about 1000 ppm of nickel plus vanadium. Generally, the catalyst of the present invention is most useful for processing stocks that contain less than about 300 ppm metals, and preferably less than about 125-150 ppm metals, such as nickel and vanadium. When the feedstock contains a very large amount of metal, the feedstock may have to be treated in a two-stage system, wherein a demetallation catalyst is used in the first stage to provide a partially demetallated feed to the second stage for contact with the catalyst of the present invention to remove the remaining metals, sulfur and waxy components.

The catalysts of the present invention are especially useful for residua hydrodesulfurization units where demetallation is not a major concern, yielding a low sulfur product with increased distillate yield. They are also highly useful with heavy stocks, such as atmospheric and vacuum residua, as well as distillates which are difficult to hydrodewax with conventional catalysts.

The catalysts embodied herein can be prepared in any conventional manner known to the art. Preferred are catalysts in which the metal components are nickel, cobalt, tungsten and molybdenum or mixtures thereof and, in particular, a mixture of nickel oxide and molybdenum oxide, NiO and MoO$_3$, which is well known in the catalytic art. Accordingly, their preparation forms no part of this invention. The base includes Zeolite Beta, optimally in combination with a crystalline silicate zeolite catalyst of the type described below, and at least one inorganic oxide, preferably alumina.

The catalysts of the present invention are especially useful in a process for hydrodemetallation, hydrodesulfurization and dewaxing of a hydrocarbon feedstock containing asphaltenes, metals and waxy components, such as, e.g., petroleum residua, by contacting the feedstock with hydrogen, and a bimodal catalyst containing at least one active hydrogenation catalyst selected from Group VIA and VIII of the Periodic Table and deposited on a support comprising alumina and Zeolite Beta.

Zeolite Beta is described in U.S. Pat. Nos. 3,308,069 and Re. 28,341, the entire contents of which are incorporated herein by reference. Zeolite Beta is a crystalline silicate zeolite having a pore size greater than 5 Angstroms. The composition of the zeolite in its as synthesized form may be expressed as follows:

$$[XNa(1.0\pm0.1-X)TEA]AlO_2 \cdot YSiO_2 \cdot WH_2O$$

where X is less than 1, preferably less than 0.75; TEA represents the tetraethylammonium ion; Y is greater than 5 but less than 100 and W is up to about 60 (it has been found that the degree of hydration may be higher than originally determined, where W was defined as being up to 4), depending on the degree of hydration and the metal cation present. The TEA component is calculated by differences from the analyzed value of sodium and the theoretical cation to structural aluminum ratio of unity.

In the fully base-exchanged form, Zeolite Beta has the composition:

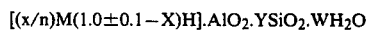
$$[(x/n)M(1.0\pm0.1-X)H] \cdot AlO_2 \cdot YSiO_2 \cdot WH_2O$$

where X, Y and W have the values listed above and n is the valence of the metal M. As it is now more conventional to refer to the silica:alumina ratio of zeolites rather than to the silicon:aluminum ratio thereof, it should be noted that the foregoing formula may also be expressed as:

$$[(x/n)M(1.0\pm0.1-X)H] \cdot Al_2O_3 \cdot YSiO_2 \cdot WH_2O$$

where Y, which determines the silica:alumina ratio, is greater than 10. Thus, the numerical value of ratios expressed as "silica:alumina" will always be twice as great as the corresponding silicon:aluminum ratio of the zeolite. For example, a silicon:aluminum ratio of 100:1 corresponds to a silica:alumina ratio of 200:1. The ratios relating to Zeolite Beta referred to throughout the remainder of this description are expressed as silica:alumina.

In the partly base-exchanged form which is obtained from the initial sodium form of the zeolite by ion exchange without calcining, Zeolite Beta has the formula:

$$[(x/n)M(1.0\pm0.1-X)TEA] \cdot Al_2O_3 \cdot YSiO_2 \cdot WH_2O$$

It is normally preferred to use the zeolite in a form which has sufficient acidic functionality to give it an alpha value of 1 or more. The alpha value, a measure of zeolite acidic functionality, is described, together with details of its measurement, in U.S. Pat. No. 4,016,218 and in *J. Catalysis,* Vol. VI, pages 278-287 (1966) and reference is made to these for such details. The acidic functionality may be controlled by base exchange of the zeolite, especially with alkali metal cations, such as sodium, by steaming, by control of the silica:alumina ratio of the zeolite, or by acid extraction of aluminum from the zeolite. Although not wishing to restrict the present invention to the use of Zeolite beta, for the purposes of describing the present invention Zeolite Beta will be used.

When synthesized in the alkali metal form, Zeolite Beta may be converted to the hydrogen form by formation of the intermediate ammonium form as a result of ammonium ion-exchange and calcination of the ammonium form to yield the hydrogen form. In addition to the hydrogen form, other forms of the zeolite, wherein the original alkali metal has been reduced, may be used. Thus, the original alkali metal of the zeolite may be replaced by ion-exchange with other suitable metal cations, including, by way of example, platinum, nickel, copper, zinc, palladium, calcium or rare earth metals.

Zeolite Beta, in addition to possessing a composition as defined above, may also be characterized by its X-ray diffraction data, which are set out in U.S. Pat. Nos. 3,308,069 and Re. 28,341. The significant d values (Angstroms, radiation: K alpha doublet of copper, Geiger counter spectrometer) are as shown in Table 1 below:

TABLE 1 d Values of Reflections in Zeolite Beta 11.4±0.2
7.4±0.2
6.7±0.2
4.25±0.1
3.97±0.1
3.0±0.1
2.2±0.1

It has been found that Zeolite Beta may be prepared with silica:alumina ratios above the 200:1 maximum specified in U.S. Pat. Nos. 3,308,069 and Re. 28,341. More specifically, ratios of at least 50:1, at least 100:1 or even higher, e.g., 250:1, 500:1, may be obtained.

The silica:alumina ratios referred to in this specification are the structural or framework ratios, that is, the ratio of the $SiO_4$ to the $AlO_4$ tetrahedra, which together constitute the structure of which the zeolite is composed. It should be understood that this ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by the thermogravimetric analysis (TGA) of ammonia desorption, a low ammonia titration may be obtained if cationic aluminum prevents exchange of the ammonium ions onto the acidic sites. These disparities are particularly troublesome when certain treatments, such as the dealuminization method described below, which result in the presence of ionic aluminum free of the zeolite structure are employed. Due care should therefore be taken to ensure that the framework silica:alumina ratio is correctly determined.

The silica:alumina ratio of the zeolite may be determined by the nature of the starting materials used in its preparation and their quantities relative one to another. Some variation in the ratio may therefore be obtained by changing the relative concentration of the silica precursor relative to the alumina precursor, but definite limits in the maximum obtainable silica:alumina ratio of the zeolite may be observed. For Zeolite Beta, this limit is usually about 200:1 (although higher ratios may be obtained) and for ratios above this value, other methods are usually necessary for preparing the desired high silica zeolite. One such method comprises dealumination by extraction with acid, and this method is disclosed in detail in U.S. patent application Ser. No. 379,399, filed May 18, 1982, by R. B. LaPierre and S. S. Wong, entitled "High Silica Zeolite Beta", and reference is made to this application for additional details of the method.

Briefly, the method comprises contacting the zeolite with an acid, preferably a mineral acid such as hydrochloric acid. The dealuminization proceeds readily at ambient and mildly elevated temperatures and occurs with minimal losses in crystallinity to form high silica forms of Zeolite Beta with silica:alumina ratios of 200:1 or even higher being readily obtainable.

The zeolite is conveniently used in the hydrogen form for the dealuminization process, although other cationic forms may also be employed, for example, the sodium form. If these other forms are used, sufficient acid should be employed to allow for the replacement by protons of the original cations in the zeolite. The amount of zeolite in the zeolite/acid mixture should generally be from 5–60% by weight.

The acid may be a mineral acid, i.e., an inorganic acid or an organic acid. Typical inorganic acids which can be employed include mineral acids, such as hydrochloric, sulfuric, nitric and phosphoric acids, peroxydisulfonic acid, dithionic acid, sulfamic acid, peroxymonosulfuric acid, amidodisulfonic acid, nitrosulfonic acid, chlorosulfuric acid, pyrosulfuric acid, and nitrous acid. Representative organic acids which may be used include formic acid, trichloroacetic acid, and trifluoroacetic acid.

The concentration of added acid should be such as not to lower the pH of the reaction mixture to an undesirably low level, which could affect the crystallinity of the zeolite undergoing treatment. The acidity which the zeolite can tolerate will depend, at least in part, upon the silica:alumina ratio of the starting material. Generally, it has been found that Zeolite Beta can withstand concentrated acid without undue loss in crystallinity, but as a general guide, the acid will be from 0.1N to 4.0N, usually 1 to 2N. These values hold good regardless of the silica:alumina ratio of the Zeolite Beta starting material. Stronger acids tend to effect a relatively greater degree of aluminum removal than weaker acids.

The dealuminization reaction proceeds readily at ambient temperatures, but mildly elevated temperatures may be employed, e.g., up to 100° C. The duration of the extraction will affect the silica:alumina ratio of the product, since extraction, being diffusion controlled, is time dependent. However, because the zeolite becomes progressively more resistant to loss of crystallinity as the silica:alumina ratio increases, i.e., it becomes more stable as the aluminum is removed, higher temperatures and more concentrated acids may be used towards the end of the treatment than at the beginning, without the attendant risk of losing crystallinity.

After the extraction treatment, the product is water washed free of impurities, preferably with distilled water, until the effluent wash water has a pH within the approximate range of 5 to 8.

The crystalline dealuminized products obtained by this method have substantially the same crystallographic structure as that of the starting aluminosilicate zeolite, but with increased silica:alumina ratios. The formula of the dealuminized Zeolite Beta will therefore be $$[(x/n)M(1.0\pm0.1-X)H].Al_2O_3.YSiO_2.WH_2O$$

where X is less than 1, preferably less than 0.75, Y is at least 100, preferably at least 150 and W is up to 60. M is a metal, preferably a transition metal or a metal of Groups IA, IIA or IIIA, or a mixture of metals. The silica:alumina ratio, Y, will generally be in the range of 100:1 to 500:1, more usually 150:1 to 300:1, e.g., 200:1 or more. The X-ray diffraction pattern of the dealuminized zeolite will be substantially the same as that of the original zeolite, as set out in Table 1 above.

If desired, the zeolite may be steamed prior to acid extraction so as to increase the silica:alumina ratio and render the zeolite more stable to the acid. The steaming may also serve to increase the ease with which the acid is removed and to promote the retention of crystallinity during the extraction procedure.

Although the present invention does not require zeolite catalysts other than Zeolite Beta, they may be added to the catalyst of the present invention in amounts generally less than 5 wt %, and preferably less than 2 wt %. The zeolite catalysts serve a variety of purposes known to the art. Typical zeolites useful herein along with their Constraint Index (CI), explained below, have the structure of the zeolites listed in the following table:

|  | CI |
|---|---|
| ZSM-4 | 0.5 |
| ZSM-5 | 6–8.3 |
| ZSM-11 | 6–8.7 |
| ZSM-12 | 2 |
| ZSM-20 | 0.5 |
| ZSM-23 | 9.1 |
| ZSM-34 | 30–50 |
| ZSM-35 | 4.5 |
| ZSM-38 | 2 |
| ZSM-48 | 3.4 |
| TMA Offretite | 3.7 |
| TEA Mordenite | 0.4 |
| Clinoptilolite | 3.4 |
| Mordenite | 0.5 |
| REY | 0.4 |
| Amorphous Silica-Alumina | 0.6 |
| Dealuminized Y (Deal Y) | 0.5 |
| Chlorinated Alumina | *1 |
| Erionite | 38 |

*Less Than

The Constraint Index is a convenient measure of the extent to which a zeolite provides control to molecules of varying sizes to its internal structure. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,016,218, to which reference is made for details of the method.

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables, such as crystal size of the zeolite, the presence of occluded contaminants, etc., may affect the Constraint Index. Therefore, it will be appreciated that it may be possible to so select test conditions as to establish more than one value for the Constraint Index of a particular zeolite. This explains the range of Constraint Indices for zeolites, such as ZSM-5, ZSM-11 and ZSM-34.

Zeolite ZSM-4 is taught by U.S. Pat. No. 3,923,639, the disclosure of which is incorporated herein by reference.

Zeolite ZSM-5 is taught by U.S. Pat. No. 3,702,886, and Re. No. 29,949, the disclosures of which are incorporated herein by reference.

Zeolite ZSM-11 is taught by U.S. Pat. No. 3,709,979, issued Jan. 9, 1973, the disclosure of which is incorporated herein by reference.

Zeolite ZSM-12 is taught by U.S. Pat. No. 3,832,449, issued Aug. 27, 1974, the disclosure of which is incorporated herein by reference.

Zeolite ZSM-20 is taught by U.S. Pat. No. 3,972,983, the disclosure of which is incorporated herein by reference.

Zeolite ZSM-23 is taught by U.S. Pat. No. 4,076,842, the disclosure of which is incorporated herein by reference.

Zeolite ZSM-34 is described in U.S. Pat. No. 4,086,186, the disclosure of which is incorporated herein by reference.

Zeolite ZSM-35 is described by U.S. Pat. No. 4,016,245, the disclosure of which is incorporated herein by reference.

Zeolite ZSM-38 is described in U.S. Pat. No. 4,046,859, the disclosure of which is incorporated herein by reference.

Zeolite ZSM-48 is described in U.S. Pat. No. 4,397,827, the disclosure of which is incorporated herein by reference.

The catalyst system of the present invention includes a hydrogenation/dehydrogenation component which is impregnated on a base comprising Zeolite Beta and one or more inorganic oxides. The hydrogenation/dehydrogenation component utilized comprises one or more metals selected from Group VIA and Group VIII of the Periodic Table. The preferred Group VIII metals include iron, nickel and cobalt, with nickel and cobalt being especially preferred. The metals of Group VIII commonly known as the "noble" metals (e.g., palladium and platinum) are considerably less effective in desulfurizing and denitrogenating the petroleum residua feedstocks treated with the catalyst of the present invention. Moreover, these metals are more expensive and more readily subject to poisoning than are iron, nickel and cobalt. Thus, the non-noble metals of Groups VIII are preferred to the noble metals thereof as a hydrogenation/dehydrogenation component in the present catalyst system. Although noble metals may, in theory, be useful in the catalyst system of the present invention, it is currently believed that in the practical applications envisioned for the present invention, the overall effectiveness of catalyst systems containing non-noble metals will be much greater. Accordingly, the following description relating to the metals content and, more specifically, the Group VIII metals content of the present catalyst system, is oriented toward the use of non-noble metals from Group VIII. It should be understood that the content of the noble metal in percent by weight would be considerably lower than the ranges set forth below for non-noble metals; a range of from about 0.1 to about 5% by weight has been found to be suitable for the noble metals.

The Group VIA and Group VIII metals content of the present catalyst system range from about 1 to about 10% of Group VIII metal and from about 2 to about 20% of Group VIA metal. The preferred amount of Group VIII metal in elemental form is between about 2% and about 10%. The preferred amount of Group VIA metal in elemental form is between about 5% and about 20%. The foregoing amounts of metal components are given in percent by weight of the catalyst on a dry basis.

The base on which the Group VIA or Group VIII metals, metal oxides or sulfides are impregnated comprises crystalline Zeolite Beta composited with an inorganic oxide, such as alumina or silica, for example, or mixtures of inorganic oxides. The amount of Zeolite Beta in the catalyst composition is from about 5 to about 30% by weight, based on the combined weight of Zeolite Beta and inorganic oxide. The amount of inorganic oxide material in the composition is from about 95 to about 70% by weight, based on the combined weight of Zeolite Beta and inorganic oxide.

The catalyst of the present invention should have a particular bimodal pore size distribution. In this connection, it is highly desirable that the catalyst have a total pore volume of from about 0.4 cc/g to about 1.0 cc/g. It is also desirable to have about 75% of the catalyst pore volume being less than about 100 Angstrom (A) units in diameter, about 20% of its pore volume greater than about 300 A in diameter, and less than about 8% of the pore volume between about 100 and 300 A in diameter.

The aforementioned range of pore volumes advantageously gives the catalyst a unique combination of functions. Unlike the catalysts of the prior art, the catalyst of the present invention has a considerable number of pores of volume less than 100 A in diameter, which accommodates the desulfurization reaction, and significant number of pores larger than 300 A in diameter, which is useful for demetallation. Thus, the bimodal function presents an advantage not seen in the prior art.

The metals content, which is defined as including both the Group VIA metal(s) and the Group VIII metal(s), most preferably nickel and molybdenum, can range from about 10 to about 25% by weight, expressed in elemental form, based on total catalyst. The relative proportion of Group VIII metal to Group VIA metal in the novel catalyst system of this invention is not narrowly critical, but Group VIA, e.g., molybdenum, is usually utilized in greater amounts than the Group VIII metal, e.g., nickel. It is submitted that one skilled in the art based on the teachings of the instant application can successfully arrive at a particular metals loading level and a particular Zeolite Beta content, depending on the characteristics of the chargestock and the desired properties of the product.

The inorganic oxide utilized in the base of the present catalyst system may include alumina, silica, and mixtures of silica and alumina (silica-alumina), as well as mixtures of other inorganic oxides, such as silica-magnesia, silica-zirconia, silica-thoria, silica-beryllia, silica-titania, silica-alumina-thoria, silica-alumina-zirconia, silica-alumina-magnesia and silica-magnesia-zirconia. The inorganic oxide may also comprise naturally occurring clays, such as those of the montmorillonite and kaolin families, which families include the sub-bentonites and the kaolins commonly known as Dixie, McNamee-Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

The preferred inorganic oxide is alumina. Alumina may be present in the catalyst in amounts ranging from 70-95% by weight based on the weight of alumina plus Zeolite Beta. As is well known by those skilled in the art, the characteristic of composited alumina catalysts depends to a very large extent on the properties of the alumina. An alumina possessing characteristics which are eminently suitable for preparation of the novel catalyst of this invention is one manufactured by Conoco Chemical Company under their tradename Catapal SB, in the form of alpha alumina monohydrate powder. Other commercial alpha alumina monohydrate powders, such as supplied by Kaiser and American Cyanamid, can be used.

The novel catalyst of this invention may be prepared, when a combination of a Group VIII and Group VIA metal is desired, by mixing Zeolite Beta with a suitable inorganic oxide, such as Catapal SB alumina, followed by extruding, calcining, exchanging to low sodium content, drying, impregnating with a Group VI metal salt solution, drying, impregnating with a Group VIII metal salt solution, and re-calcining. Other methods can be employed to prepare the catalyst of this invention, such as mixmulling of the Zeolite Beta, inorganic oxide support and hydrogenation/dehydrogenation component, followed by extruding and calcining. The extrudate then may be exchanged to low sodium, dried and re-calcined. The exchange would be unnecessary if the Zeolite Beta is exchanged to low sodium prior to blending with the alumina for extrusion. (This procedure was used in the Example.)

Typical process conditions utilized in carrying out the novel process of this invention include a hydrogen pressure of about 500-3000 psig, a temperature of about 600°-850° F. (315°-455° C.), and a liquid hourly space velocity (LHSV) of 0.1-5, based on the total complement of catalyst in the system.

The novel catalyst system of the present invention is effective in treating petroleum residua to reduce the metal, sulfur and Conradson Carbon Residue (CCR) content of the residua, as well as reducing its pour point. In general, the residua which may be most effectively treated with the catalyst and process of the present invention are those having properties such that at least 50% of the residua boils above 900° F. (482° C.). For example, a specific type of residua which may advantageously be treated is residua derived from Arabian Light crude having the following characteristics:

| | | | |
|---|---|---|---|
| Initial Boiling Point, °F. | 500 | 850 | 1000 |
| Gravity, °API | 19.8 | 11.7 | 8.0 |
| Specific Gravity, 60/60° F. | 0.9352 | 0.9881 | 1.0143 |
| Pour Point, °F. | — | 55 | 80 |
| Viscosity at 212° F. | — | 109.13 | 615.8 |
| Sulfur, wt % | 2.89 | 3.56 | 4.02 |
| Carbon Residue, (CCR) wt % | 4.9 | 11.6 | 16.7 |
| Nickel and Vanadium Content, ppm | 23 | 43 | 66 |

The following examples will illustrate the novel process of this invention.

EXAMPLE 1

A catalyst sample was prepared by extruding a mixture of Zeolite Beta in ammonium form and Catapal SB alumina. The Zeolite Beta utilized had a silica:alumina ratio of 19:1, a residual sodium content of 0.02 wt % and an alpha activity of 581; the Zeolite Beta was calcined, but was not steamed. The extrudate was then dried and calcined at 1000° F. (538° C.) to form a base containing 10 wt % of Zeolite Beta and 90 wt % $Al_2O_3$. The calcined extrudate was then impregnated with ammonium heptamolybdate, dried, and then impregnated with nickel nitrate. The metal-impregnated catalyst was then calcined at 1000° F. to form a catalyst containing 3.5 wt % NiO and 10 wt % $MoO_3$, based on total catalyst weight. The catalyst particles and the properties of a commercially available resid hydrodesulfurization catalyst (HDS-1441, manufactured by American Cyanamid) are listed below:

| | Catalyst Properties | |
|---|---|---|
| Catalyst | Example 1 | Commercial HDS-1441 |
| $MoO_3$, wt % | 10 | 11 |
| NiO, wt % | 3.5 | — |
| CoO, wt % | — | 3.4 |
| Surface Area, $m^2$/g | 206 | 270 |
| Pore Volume, cc/g ($N_2$ Method) | 0.494 | 0.542 |
| Avg. Pore Diameter, A | 96 | 80 |
| Pore Size Distribution % | | |
| Pore Volume in Pores of | | |
| 0–30 A Diameter | 15 | 13 |
| 30–50 A | 5 | 12 |
| 50–80 A | 42 | 73 |
| 80–100 A | 13 | 1 |
| 100–150 A | 1 | 0 |
| 150–200 A | 1 | 0 |
| 300+ A | 18 | 0 |

EXAMPLE 2

A Lagomedio atmospheric resid was hydroprocessed in a shaker bomb unit utilizing the catalyst from Example 1. This resid had the following properties prior to treatment:

| Initial Boiling Point, °F. (°C.) | 500 (260) |
|---|---|
| Gravity, °API | 18.1 |
| Specific Gravity, 60/60° F. | 0.9459 |
| Pour Point, °F. (°C.) | 75 (24) |
| Sulfur, wt % | 1.99 |
| Carbon Residue (CCR), wt % | 7.81 |
| Nickel Content, ppm | 21 |
| Vanadium Content, ppm | 220 |

The process conditions utilized were as follows:

| Lagomedio Atmospheric Resid, g | 300 |
|---|---|
| Catalyst, g | 15 |
| Temperature, °F. (°C.) | 750 (400) |
| Hydrogen Pressure, psig | 2000 |
| Reaction Time, min | 80 |

The results of the hydroprocessing are set forth below, along with the results obtained utilizing the commercially available resid hydrosulfurization catalyst HDS-1441 under the same process conditions as above.

| | Charge Stock | Catalyst From Example 1 | Commercial Catalyst HDS-1441 |
|---|---|---|---|
| Sulfur Content, Wt % | 1.99 | 1.00 | 0.97 |
| Pour Point, °F. (°C.) | 75 (24) | 45 (7) | 60 (15) |

EXAMPLE 3

A second Lagomedio atmospheric resid was treated in a shaker bomb unit utilizing the catalyst from Example 1, under the process conditions set forth in Example 2. The resid had the following properties prior to treatment:

| Initial Boiling Point, °F. (°C.) | 500 (260) |
|---|---|
| Gravity, °API | 18 |
| Sulfur, wt % | 2.12 |
| Carbon Residue (CCR), wt % | 7.29 |
| Nickel Content, ppm | 22 |
| Vanadium Content, ppm | 235 |

The results obtained with the catalyst of the present invention and the commercially available prior art catalyst identified in Example 2 are set forth below.

| | Charge Stock | Catalyst From Example 1 | Commercial Catalyst HDS-1441 |
|---|---|---|---|
| Total Liquid Product (TLP) | | | |
| Vanadium, ppm | 235 | 95 | 124 |
| Sulfur, wt % | 2.12 | 1.054 | 1.13 |
| CCR, wt % | 7.29 | 5.89 | 5.23 |
| Removals, % | | | |
| Vanadium | — | 59.6 | 47.2 |
| Sulfur | — | 50.4 | 46.8 |
| CCR | — | 19.2 | 28.3 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:
1. A catalytic composition comprising:
a base component comprising 5–30 wt % Zeolite Beta and 95–70 wt % of an inorganic oxide material, based on the combined weight of said Zeolite Beta and the inorganic oxide material; and
a hydrogenation/dehydrogenation component supported on the base component, said hydrogenation/dehydrogenation component comprising a catalytically effective amount of at least one metal selected from Group VIA and Group VIII of the Periodic Table, said catalyst having about 75% of its pore volume in pores no greater than 100 Angstrom units in diameter and about 20% of its pore volume in pores greater than about 300 Angstrom units in diameter.
2. The catalytic composition of claim 1, wherein said base component comprises an additional component selected from the group having the structure of ZSM-4, ZSM-20, Mordenite, TEA Mordenite, Dealuminized Y, Rare Earth Y, Ultrastable Y, Chlorinated Alumina, and Amorphous silica-alumina.

3. The catalytic composition of claim 1, wherein said base component further comprises zeolites selected from the group having the structure of ZSM-5, ZSM11, ZSM-12, ZSM-23, ZSM-34, ZSM-35, ZSM-38, ZSM-48, TMA Offretite, Clinoptilolite, and Erionite.

4. The catalytic composition of claim 1, wherein the hydrogenation/dehydrogenation component comprises 1–10 wt % of at least one Group VIII metal selected from iron, cobalt and nickel, expressed in elemental form, and 5–20 wt % of at least one Group VI metal, expressed in elemental form.

5. The catalytic composition of claim 4, wherein said Group VIII metal comprises nickel and said Group VI metal comprises molybdenum.

6. The catalytic composition of claim 4, wherein said Group VIII metal comprises nickel oxide and said Group VI metal comprises molybdenum oxide.

7. The catalytic composition of claim 4, wherein the inorganic oxide material is selected from the group consisting of alumina, silica, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, and naturally occurring clays.

8. The catalytic composition of claim 7, wherein the inorganic oxide material comprises alumina.

* * * * *